Nov. 11, 1958 J. R. WEST 2,859,860
INFEED MECHANISM
Filed May 3, 1956 2 Sheets-Sheet 1
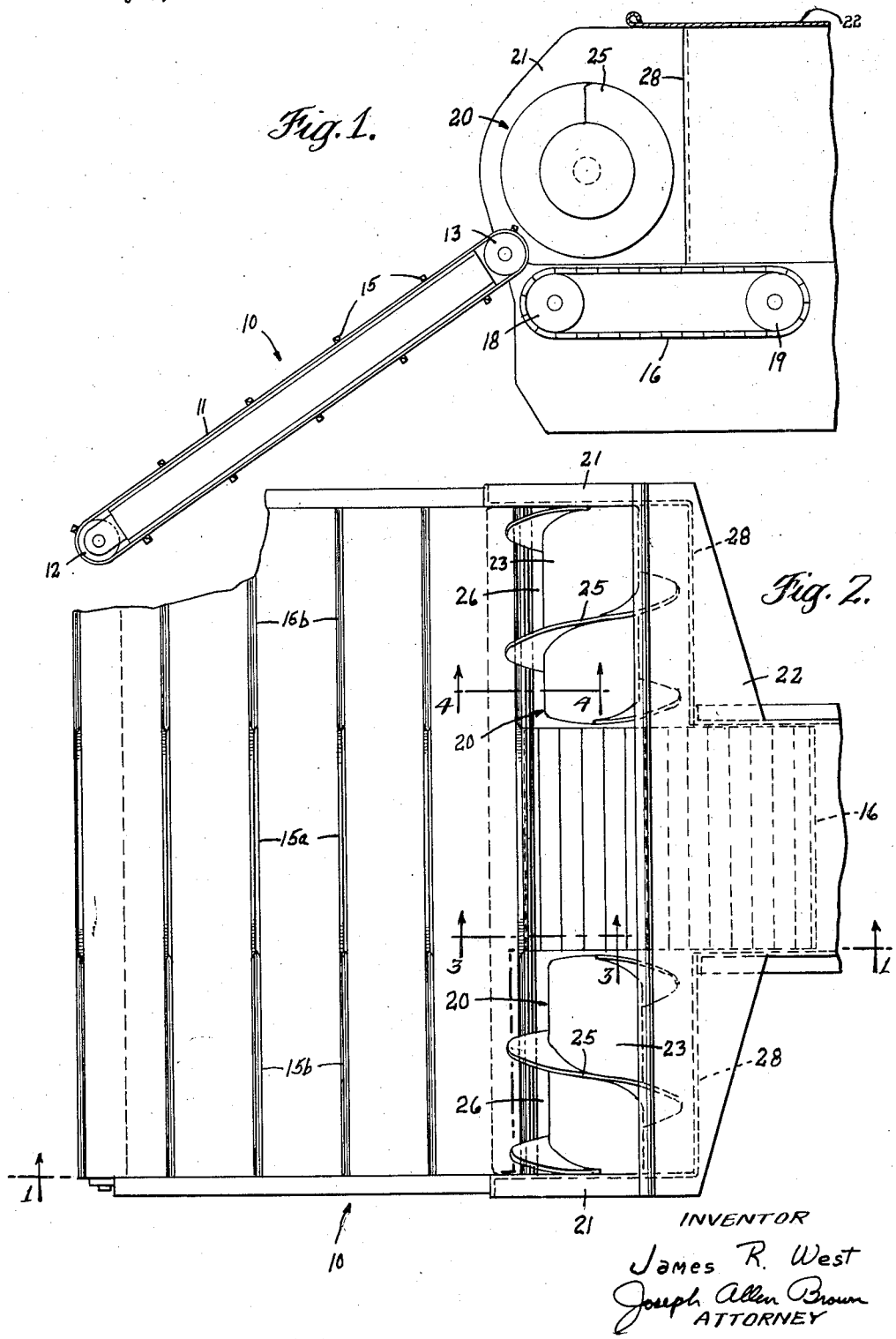
INVENTOR
James R. West
Joseph Allen Brown
ATTORNEY

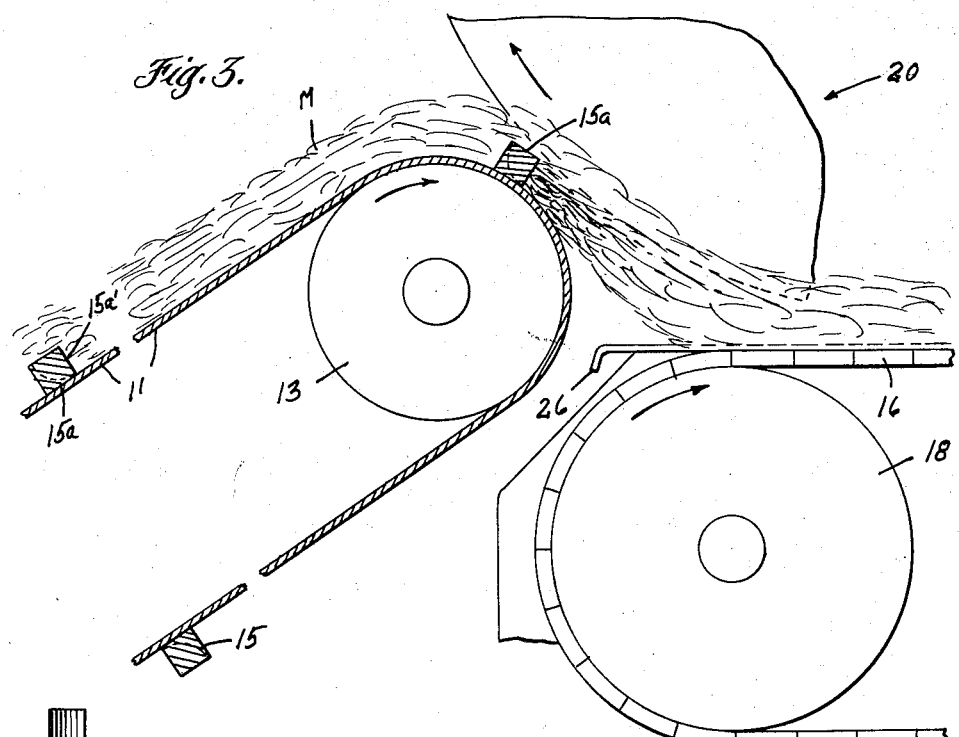
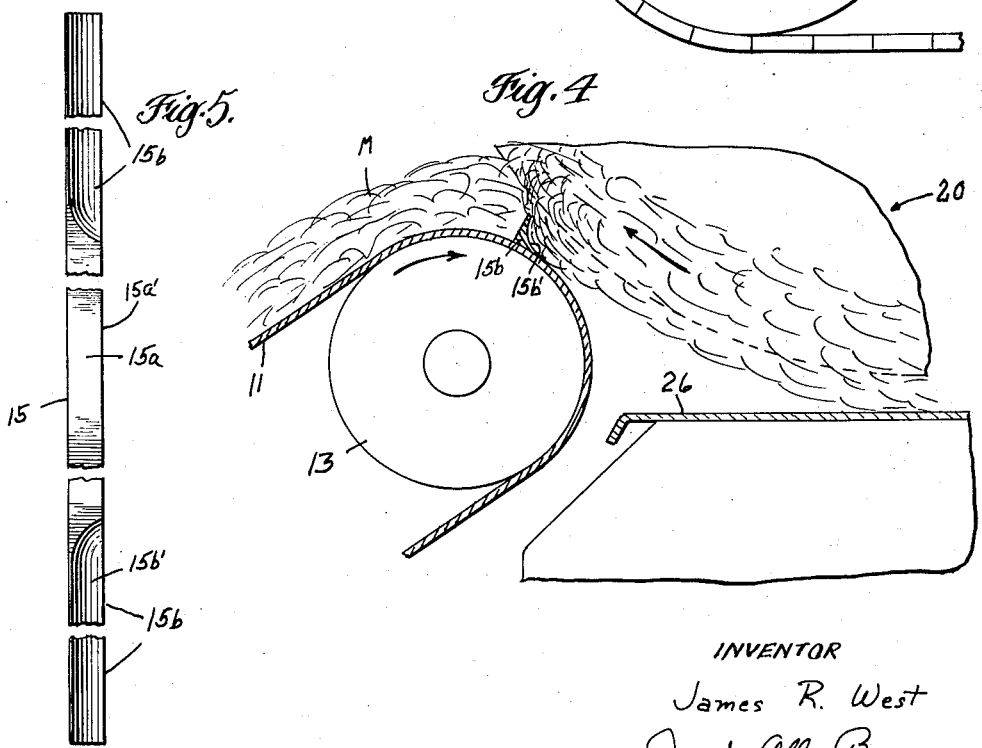

United States Patent Office 2,859,860
Patented Nov. 11, 1958

2,859,860

INFEED MECHANISM

James R. West, New Holland, Pa., assignor to Sperry Rand Corporation, New Holland, Pa., a corporation of Delaware Application May 3, 1956, Serial No. 582,546

3 Claims. (Cl. 198—104)

The present invention relates to an improvement in the infeed mechanism shown and described in my pending U. S. patent application Serial No. 453,902, filed September 2, 1954, now Patent No. 2,800,217. More particularly, the invention relates to an improvement in the construction of the inclined feed apron of the mechanism.

In my pending patent application there is shown an inclined feed apron which travels over relatively spaced rolls. Crop material is deposited on the apron from a conventional mower or pick-up unit; and, this material is elevated by the apron to a horizontal endless conveyor, and to two feed augers on opposite sides of the horizontal conveyor which serve to condense the delivered material. The feed augers are rotatable in the same direction as the direction of rotation of the endless feed apron.

To enhance the feeding action and to prevent backsliding of the material on the feed apron, it has been the practice to provide spaced parallel transverse slats on the feed apron and formed integral therewith. Each slat is, conventionally, rectangular in cross section for its entire length. The central portions of the slats are effective against the material on the central area of the apron and in depositing such material on the horizontal conveyor. However, considerable difficulty has been experienced in material being lost between the feed apron and the feed augers. It has been found that the portions of the transverse slats on opposite sides of the central area of the apron impede the lifting of the crop material from the apron by the augers. Shorter strands of material become shielded by the side portions of the slats and defy removal by the augers, dropping to the ground between the feed apron and augers. Obviously, the loss of such material is undesirable.

The primary object of this invention is to provide a novel configuration for transverse slats on a feed apron of a mechanism of the character described.

Another object of this invention is to provide transverse slats of the character described which assist rather than impede feed augers in removing crop material from a feed apron.

A further object of this invention is to provide transverse slats of the character described which practically eliminate all loss of crop material between the feed augers and the feed apron.

Other objects of this invention will be apparent hereinafter from the specification and from the recital in the appended claims.

In the drawings:

Fig. 1 is a fragmentary part side elevation, part section of the infeed mechanism of a forage harvester having an inclined feed apron constructed according to one embodiment of this invention, said section being taken generally on the lines 1—1 of Fig. 2 and looking in the direction of the arrows;

Fig. 2 is a fragmentary plan view of the infeed mechanism;

Fig. 3 is a generally diagrammatic fragmentary section taken on the line 3—3 of Fig. 2 and looking in the direction of the arrows;

Fig. 4 is a view similar to Fig. 3 taken on the line 4—4 of Fig. 2 and looking in the direction of the arrows; and Fig. 5 is a fregmentary plan view of one of the slats of the infeed mechanism.

Referring now to the drawings, the invention is there illustrated in its preferred application to the pick-up and infeed mechanism of a conventional ground traversing field forage harvester of which there are illustrated only those portions of the harvester which are essential for a proper understanding of the invention. Numeral 10 indicates a feed apron which comprises an endless belt 11 trained over spaced parallel rollers 12 and 13. Roller 12 is mounted for movement toward and away from roller 13 to effect a proper tightness of the feed apron, there being provided conventional spring biasing means, not shown, for this purpose.

Endless belt 11 has a plurality of outwardly projecting, spaced, parallel, transverse slats 15. As shown best in Figs. 2 and 5, the slats have central sections 15a which are rectangular in cross section and side sections 15b which are generally triangular in cross section. The side sections 15b present forwardly inclined faces, relative to the direction of movement of feed apron 10. This particular configuration of the slats 15 is employed for reasons hereinafter described.

The central area of feed apron 10 terminates at its upper end in proximity to a horizontal, steel-slatted endless conveyor 16 trained over suitably journaled rolls 18 and 19. Conveyor 16 has a width substantially the same as the width of the central, rectangular sections 15a of the apron slats. As shown in Figs. 1 and 3, the conveyor is disposed slightly below the upper or delivery end of apron 10 so that forage or the like delivered by the apron will fall upon the conveyor.

Mounted on opposite sides of conveyor 16 are a pair of augers 20—20. These augers serve to lift the material M delivered by the side portions 15b—15b of apron 10 and convey this material inwardly, that is, toward the endless conveyor 16 so that the material is laterally consolidated and merged with the material delivered directly to endless conveyor 16 from central slat portions 15a. The augers are suitably rotatably mounted on the side walls 21—21 of a housing 22; and, they are driven by means, not shown, in the same direction as the direction of rotation of the endless belt 11, as indicated by the arrows in Figs. 3 and 4.

Each auger comprises a cylindrical tubular body 23 having helical flights 25 wound around it in a conventional manner. However, the flights 25 on the respective augers are oppositely wound so that the augers cooperate in consolidating and delivery of material toward conveyor 16. The augers are rotatable above platforms 26—26, respectively, and in front of back wall portions 28—28 of housing 22. Walls 21 and 28 serve to confine the crop material delivered to the augers.

As shown in Fig. 3, the central portion of apron 10 and the central rectangular slat sections 15a thereon, deliver crop material M onto conveyor 16. The generally perpendicular forward faces 15a' of the slat sections 15a feed and force the central portion of the crop material in an upward direction; and, then they aggressively direct the material downwardly and onto endless conveyor 16. The positive feeding action of the central portions 15a of the slats insures that the crop material traverses the space between the discharge end of apron 10 and conveyor 16 and no significant amount of material is lost between the apron and conveyor 16.

The side portions 15b—15b of the apron slats deliver crop material to the augers 20—20; and such crop material is picked off the apron 10 as illustrated in Fig. 4. The angular front faces 15b' of the side portions 15b cooperate with the augers to insure complete removal of the crop material delivered. The upward sweeping action of the peripheies of the auger flights 25 cleanly remove the crop material from in front of the side slat sections. Heretofore, when the side portions of the conveyor slats were rectangular cross sections, the front faces of the sections, extending perpendicular to the feed apron, worked against the augers, impeding the removal of crop material in front of the slats. The difficulty encountered can be visualized in Fig. 3. Directing the crop material downwardly from the central portion of the conveyor apron and onto conveyor 16 is not only satisfactory, but desirable. However, this same action at the sides of the apron operates against the attempt of the augers 20 to lift the material from the side portions of the apron and a portion of the material is able to move off the discharge end of apron 10 without being picked up by the augers. This material is then able to drop between the platforms 26 and apron 10 and fall to the ground. However, with the new configuration of apron slats shown herein, such loss is completely eliminated.

The tendency of the crop material being delivered to escape down between the feed apron and the pick-up is greater when the crop material being delivered is fine or light rather than coarse or heavy. In fact, when coarser materials are being delivered, loss of material is not great even when slats 15, which are rectangular in cross section for their entire lengths, are used. Therefore, it is contemplated that apron 11 may be turned around, if desired, so the back faces of the slats 15 face forwardly when heavy stemmy material, such as sorgo, amber cane, etc., is being harvested. This will provide a somewhat more aggressive feeding action.

Applicant, by his invention, has simply and easily solved a heretofore troublesome problem. The inclined front faces of the side portions of the conveyor slats not only permit the augers to cleanly sweep even the lightest crop material delivered by apron 10 from the apron, but assist the augers in carrying out this function. Whereas considerable material was lost heretofore between the augers and the feed apron, such loss is now practically nil.

While this invention has been described in connection with a particular embodiment thereof, it will be understood that it is capable of further modification and this application is intended to cover any changes, variations, or adaptation of the invention following, in general, the principles of the invention, and including such departures from the present disclosure as come within known or customary practice in the art to which the invention pertains, and as fall within the scope of the invention or the limits of the appended claims.

Having thus described my invention, what I claim is:

1. An improvement in a mechanism for feeding crop material into a housing through a feed opening therein, wherein there is provided a feed apron of greater width than said opening extending laterally on opposite sides thereof and inclined downwardly therefrom, the apron having a discharge end spaced forwardly from said opening, a relatively narrower generally horizontal infeed conveyor bridging said space and moving rearwardly from said apron and into said opening, a pair of augers on opposite sides of said infeed conveyor and extending transverse to the direction of movement of said apron and infeed conveyor, the augers being rotatable in the same direction as the direction of movement of said apron and having flights adapted to laterally consolidate the material delivered by said apron toward said infeed conveyor, and a plurality of spaced parallel transverse slats on said apron, the improvement residing in said slats, wherein each slat has a central portion which is generally rectangular in cross section and which is adapted to deposit crop material on said infeed conveyor and portions on opposite sides of said central portion which are generally triangular in cross section and present inclined faces in the direction of movement of the apron, said inclined surfaces being such that they cooperate with said augers to obtain a ready transfer of the material to the augers.

2. An improvement in a mechanism for feeding crop material into a housing through a feed opening therein, wherein there is provided a feed apron of greater width than said opening and extending laterally on opposite sides thereof, the apron having a discharge end spaced forwardly from said opening, a relatively narrower infeed conveyor bridging said space, a pair of augers on opposite sides of said infeed conveyor and extending transverse to the direction of movement of said apron and infeed conveyor, the augers being rotatable in the same direction as the direction of movement of said apron and being adapted to consolidate the material delivered by said apron toward said infeed conveyor, and one transverse slat, at least, on said apron, said improvement residing in said slat wherein it has a central portion, which is generally rectangular in cross section, and portions on opposite sides of said central portion generally triangular in cross section and having faces inclined in the direction of movement of said apron.

3. An improvement in a mechanism for feeding crop material into a housing through a feed opening therein, wherein there is provided a feed apron of greater width than said opening extending in front of the opening and laterally to one side thereof, the apron having a discharge end spaced forwardly from said opening, an infeed conveyor bridging the space between said opening and the portion of the apron in front of the opening, an auger extending at one side of said infeed conveyor in register with the laterally extending portion of said apron and adapted to receive crop material therefrom, said auger being rotatable in the same direction as the direction of movement of said apron and being adapted to consolidate the material delivered by the lateral portion of said apron with the material delivered by the portion of the apron in front of the housing opening, and one slat, at least, on said apron extending transverse to the direction of movement of the apron, said improvement residing in said slat wherein the slat has a portion in register with said infeed conveyor and a portion in register with said auger, and the portion in register with said auger, being generally triangular in cross section and having a face inclined in the direction of movement of the apron.

References Cited in the file of this patent

UNITED STATES PATENTS

| | | |
|---|---|---|
| 592,578 | Akers | Oct. 26, 1897 |
| 1,107,730 | Torrance | Aug. 18, 1914 |
| 2,121,628 | Fleming | June 21, 1938 |
| 2,290,456 | Stilwell | July 21, 1942 |
| 2,395,761 | Reed | Feb. 26, 1946 |
| 2,470,704 | Korsmo | May 17, 1949 |